Feb. 7, 1939.   C. D. DILLINGHAM   2,146,175
TRACTION WHEEL
Filed Feb. 14, 1938   2 Sheets-Sheet 1

INVENTOR
C. D. Dillingham
BY
ATTORNEY

Feb. 7, 1939.  C. D. DILLINGHAM  2,146,175
TRACTION WHEEL
Filed Feb. 14, 1938  2 Sheets-Sheet 2

INVENTOR
C. D. Dillingham
BY
ATTORNEY

Patented Feb. 7, 1939

2,146,175

UNITED STATES PATENT OFFICE 2,146,175

TRACTION WHEEL

Carl D. Dillingham, Oakland, Calif.

Application February 14, 1938, Serial No. 190,447

5 Claims. (Cl. 305—11)

This invention relates in general to a traction wheel for motor vehicles and in particular the invention is directed to a traction wheel especially designed for use on vehicles traversing loose sand or earth as on the desert.

The principal objects of my invention are to provide a traction wheel of the type described which provides a maximum of traction; to provide a traction wheel including shock absorbing mechanism; and to provide a traction wheel which may be used in connection with present vehicles without reconstruction of the driving and wheel mounting mechanism.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
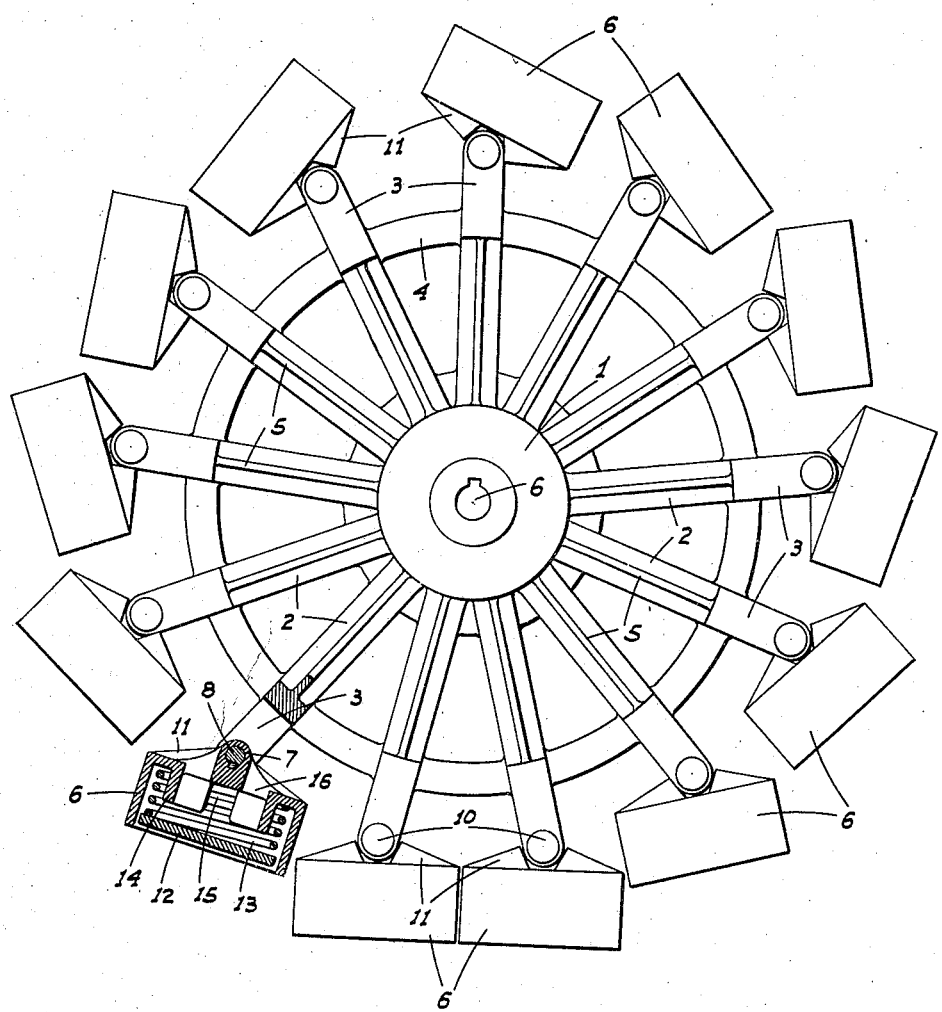
Figure 1 is a side elevation of my improved traction wheel; one of the traction members being shown in section.
Figure 2:
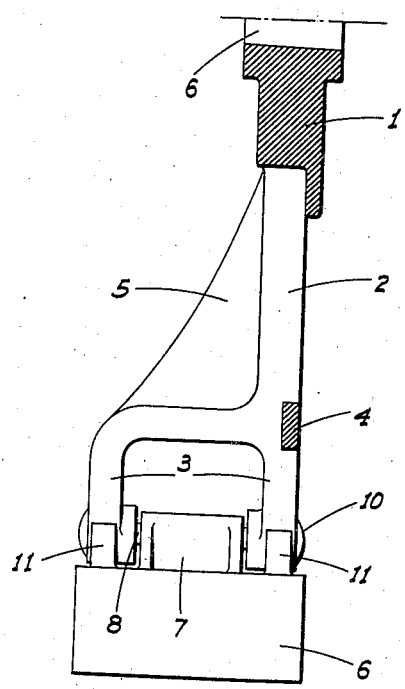
Figure 2 is a side view of one of the wheel spokes and attached traction member.
Figure 3:
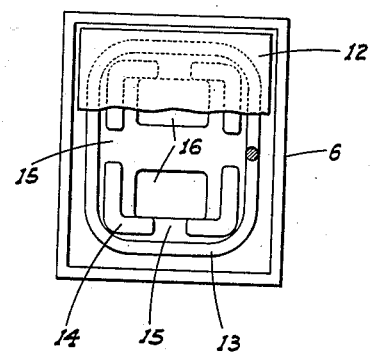
Figure 3 is a bottom view of one traction member with the ground engaging plate partly broken away.
Figure 4:
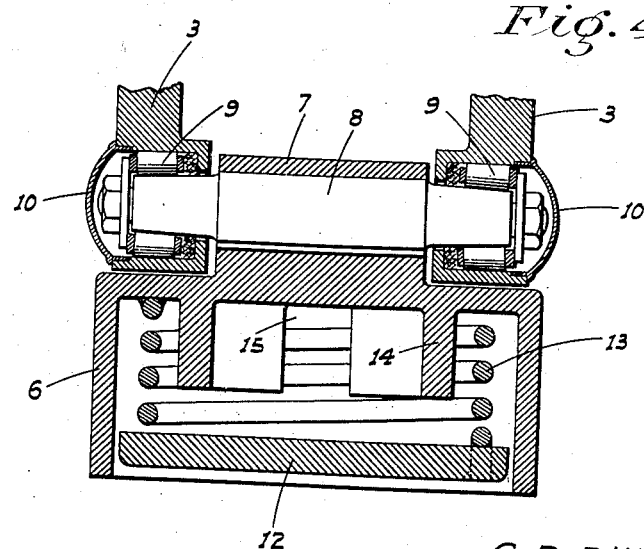
Figure 4 is an enlarged cross section of one traction member and the adjacent attached portion of the corresponding wheel spoke.

Refering now more particularly to the characters of reference on the drawings, my improved traction wheel comprises a hub 1 from which radiate a plurality of wheel spokes 2; each spoke being formed at the outer end with a laterally disposed fork 3. A band 4 is formed with and strengthens spokes adjacent the forks while an integral bracing web 5 extends between one side of each spoke 2 and the fork 3. The hub 1 is bored, as at B and includes a key way as shown; the wheel thus being adapted to be mounted on the axle of a motor vehicle in the usual manner.

The fork at the outer end of each spoke carries a traction member which is constructed and mounted as follows:

Each traction member comprises a hollow rectangular foot or cup 6 open outwardly of the wheel. A transverse boss 7 is formed on the back of the rectangular cup 6 and a double ended spindle 8 is mounted in and projects from such boss. The projecting ends of spindle 8 are journaled in antifriction bearings 9 in the outer ends of the corresponding fork 3. Caps 10 prevent access of dust and dirt to such bearings. As so mounted, the cups may have easy pivotal movement in the plane of rotation of the wheel. To limit such pivotal movement and prevent one cup from striking an adjacent cup as said cups approach a ground engaging position, I provide a pair of spaced, longitudinally extending stop ribs 10 11 on the back of cups on each side of the boss. These stops are spaced a distance equal to that between the legs of the fork so that when a cup swings one way or the other, the legs engage the stops after predetermined swinging movement of the cup.

Each cup is provided with a ground engaging plate 12 disposed within the cup with a loose running fit. A heavy duty helical spring 13 is connected in fixed relation between the bottom of the cup and the plate, each coil of the spring being of substantially rectangular configuration and rounded at the corners. A symmetrical bumper flange 14 depends into the spring from the bottom of each cup and limits the movement of the plate 12 into the cup. This flange 14 is centrally cut away at both sides and ends, as at 15, so that sand, dirt, etc. can pass from the cup about the spring through outlet ports 16 cut through the back of the cup on both sides of the boss. By reason of this arrangement, dirt and sand cannot clog in the cup and which would otherwise restrict movement of plate 12.

In use, the wheel has little tendency to sink into sand or loose dirt over which it is passing as the cups cannot readily be pressed into the sand or loose dirt and the wheel, in effect, "walks" thereover.

In the present embodiment of the invention two of the cup traction members are in full engagement with the ground at all times.

Due to the freedom of turning of the cups, they tend to swing toward a ground engaging position as the wheel turns, and by reason of the stop ribs 11, they are held in a substantially horizontal and ground engaging position before they actually engage the ground, so that such engagement when it takes place will be flat and firm. The plates 12, being depressible into the cups, allow the rims of the cups to serve as grousers, while always maintaining their own flat contact with the ground. Also the plates being resiliently mounted, have a cushioning or shock absorbing action so that the wheel does not "ride hard."

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A motor vehicle traction wheel comprising a hub, rigid spokes radiating from the hub, a metallic cup mounted on the outer end of each spoke and open outwardly of the wheel, a ground engaging plate disposed in each cup for inward movement, and a compression spring between each plate and bottom of the corresponding cup whereby to resist such inward movement of the plate; there being a port through the bottom of each cup and through which port sand or dirt in the cup under the plate may escape.

2. A motor vehicle traction wheel comprising a hub, rigid spokes radiating from the hub, a metallic cup mounted on the outer end of each spoke and open outwardly of the wheel, a ground engaging plate disposed in the cup for inward movement, and a compression spring between the plate and bottom of the cup whereby to resist inward movement of the plate; the spring being fixed at one end to the plate and at the other end to the bottom of the cup.

3. A motor vehicle traction wheel comprising a hub, rigid spokes radiating from the hub, a metallic cup mounted on the outer end of each spoke and open outwardly of the wheel, a ground engaging plate disposed in the cup for inward movement, and a compression spring between the plate and bottom of the cup whereby to resist inward movement of the plate; there being a stop element projecting outwardly from the bottom of the cup within the spring whereby to limit inward movement of the plate after predetermined movement thereof against the compression of the spring.

4. A motor vehicle traction wheel comprising a hub, rigid spokes radiating from the hub, a metallic cup mounted on the outer end of each spoke and open outwardly of the wheel, a ground engaging plate disposed in the cup for inward movement, a helical compression spring disposed in the cup between the plate and bottom of the cup whereby to resist inward movement of the plate, the spring being substantially symmetrical to the plate and of a diameter to engage the plate in relatively close proximity to the edges thereof, a symmetrical bumper flange projecting outwardly from the bottom of the cup and closely surrounded by the spring; said flange being cut away at spaced points and the bottom of the cup within the flange having a port formed therethrough.

5. A motor vehicle traction wheel comprising a hub, rigid spokes radiating from the hub, each spoke being formed at its outer end with a fork disposed transversely of the wheel, one leg of each fork being alined with the spoke and the other leg disposed laterally outward of the vertical plane of the spoke, a traction cup disposed beyond each spoke, and means mounting said cups in connection with the corresponding forks adjacent their outer ends and for pivotal movement in the plane of rotation of the wheel; the cups being mounted on the forks so that their lateral inner edges are disposed in a plane adjacent the corresponding edges of the spokes.

CARL D. DILLINGHAM.